United States Patent [19]

Greune et al.

[11] Patent Number: 4,719,749
[45] Date of Patent: Jan. 19, 1988

[54] VALVE FOR A FLUID FLOW ENGINE

[75] Inventors: Christian Greune, Fuerstenfeldbruck; Georg Zotz, Haimhausen, both of Fed. Rep. of Germany

[73] Assignee: MTU Motoren-und Turbinen-Union Muenchen GmbH, Munich, Fed. Rep. of Germany

[21] Appl. No.: 872,524

[22] Filed: Jun. 10, 1986

[30] Foreign Application Priority Data

Jun. 13, 1985 [DE] Fed. Rep. of Germany ....... 3521193

[51] Int. Cl.[4] ............................................. F02C 7/232
[52] U.S. Cl. .................................... 60/39.094; 60/734
[58] Field of Search .................... 60/39.094, 734, 739, 60/740, 741, 742, 39.281

[56] References Cited

U.S. PATENT DOCUMENTS

| 2,846,845 | 8/1958 | Parker | 60/39.094 |
| 2,881,827 | 4/1959 | Roche et al. | 60/39.094 |
| 3,339,574 | 9/1967 | Erb et al. | |
| 3,498,056 | 3/1970 | Avery | 60/39.094 |
| 4,095,418 | 6/1978 | Mansson et al. | 60/39.094 |

Primary Examiner—Louis J. Casaregola
Attorney, Agent, or Firm—W. G. Fasse; D. H. Kane, Jr.

[57] ABSTRACT

A valve for a fluid flow engine is constructed so that it can cause a required pressure build-up, so that it can drain excess fuel back to a tank, and so that the engine can be shut-off. Hot fuels that must be returned into the tank are prevented from damaging the fuel intake slots. The pressure build-up is controlled or determined by a separate fuel metering surface.

19 Claims, 6 Drawing Figures

VALVE FOR A FLUID FLOW ENGINE

FIELD OF THE INVENTION

The invention relates to a valve for a fluid flow engine, more specifically to a pressure build-up-, drainage-, and shut-off valve for gas turbine engines and to a control arrangement for such a valve to control the fuel supply.

DESCRIPTION OF THE PRIOR ART

A pressure build-up, and drainage valve of the type to which the invention relates may be referred to as a control valve which is known from the U.S. Pat. No. 3,339,574 such a valve has line connections in the form of double unions provided with sealing rings. These line connections are provided for the fuel supply into the valve, the fuel discharge out of the valve to the injection nozzle of the combustion chamber, and for the fuel drainage. The known valve further comprises a cylinder in which a stepless control piston alternatingly closes openings of the cylinder. This control piston is impinged upon by fuel from the fuel supply, whereby the fuel pressure activates the piston against the effect of a spring pressure. Some of the openings of the cylinder serve to allow the fuel supply to the injection nozzles when the fuel supply is turned-on and the respective opening is opened by the control piston. These openings are closed when the fuel supply is shut-off, by means of the return spring caused movement of the control piston. Simultaneously with the return stroke movement of the control piston other bore-holes in the cylinder are uncovered to allow a draining of any residual fuel remaining in the injector nozzles into the drainage line.

Thus, in said known case at hand, the piston end or metering surface of the control piston of the valve, lying on the end opposite the return spring, is impinged upon by fuel which has been metered by an engine fuel controller. That is, the fuel injection pressure is simultaneously the control pressure of the valve for the purpose of piston displacement against the return spring, so that the fuel injection pressure is effective as a control pressure at one and the same above mentioned metering location.

By these means in emergency situations, it is not possible to achieve an extremely quick independent shut-off of the engine, because the valve shut-off process is dependent on a reduction in the fuel injection pressure in the fuel metering unit.

Furthermore in the valve known from U.S. Pat. No. 3,339,574 the annular space constantly connected to the fuel nozzles, is formed between the valve cylinder and an outer housing around this valve cylinder. Thereby the portion of the valve cylinder which bounds the inner side of the annular space, comprises the fuel metering bores which are followed by first and second drainage bores which are arranged axially displaced and behind the fuel metering bores. In the first piston end position or shut-off position of the fuel metering bores the first drainage bores are opened to a further annular chamber which is formed between a coaxial outer recess of the piston and the bounding wall of the valve cylinder. The further annular chamber is connected through the second drainage bores to a ring channel, which communicate with the drainage line and which is arranged between a coaxial outer recess of the valve cylinder and a wall section of the outer housing which covers this outer recess.

Thus, in the mentioned fuel shut-off or drainage position of the valve, the comparatively sensitive structural parts and components which are essential for an effective valve functioning are constantly subjected to the comparatively high-temperature drainage fuel stream. As a result, first a coking danger of the fuel metering and drainage bores is to be expected comparatively early, and second, an early wear and tear danger of the respective piston seals exists, whereby additionally the danger of a piston seizing in the valve cylinder exists since the essential piston guide surfaces are similarly subjected to relatively high temperatures of the drainage fuel stream.

Furthermore, in the known valve the mechanical seal damage cannot be eliminated in so far as the pertinent piston ring-type seals of the control piston must travel over the above named drainage bores during operation of the valve.

Furthermore, only a highly inadequate sealing effect can be assured by means of the end-face central seal-disc serving as a limit stop in the known valve, since alignment errors are not compensated.

OBJECTS OF THE INVENTION

It is the object of the invention to avoid the disadvantages of the prior art and to provide a pressure build-up, drainage, and shutt-off valve that makes possible extremely rapid control functions with a comparatively high operating reliability especially with regard to a rapid engine shut-down procedure in an emergency situation.

SUMMARY OF THE INVENTION

The stated object is achieved according to the invention by the features set forth in the independent main claim.

Among other things, the invention makes possible a "clean" function separation, with regard to the thermal and mechanical requirements, by means of the two control pistons. The first control piston controls the fuel supply; the second control piston is a central guide means for the residual fuel flowing out of the fuel injection nozzles into the drainage line when the engine is shut-off.

In the common first end position of both control pistons (drainage position) the hot residual fuel can drain out to the drainage by means of the annular chamber and the second control piston and thus through non-sensitive parts and especially without contacting the parts (fuel intake slots) of the first control piston which are responsible for controlling the fuel. The valve disc configuration provided by the embodiment is thereby not only a stop means on the valve housing, but is also an advantageous shut-off and shielding means of the hot residual fuel stream with respect to the part of the first control piston which includes the fuel slots.

A further essential advantage of the present control valve over the prior art isseen in that the system pressure build-up is not determined by the fuel flowing to the engine, but instead a separate metering surface controls this pressure.

Thus, it is possible—without having to reduce the fuel injection pressure—to achieve an extremely rapid engine shut-off operation, for example by means of a magnetic valve, which will be described in more detail below.

Further advantageous embodiments of the invention are defined in the dependent claims.

BRIEF DESCRIPTION OF THE DRAWINGS

The invention is further described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
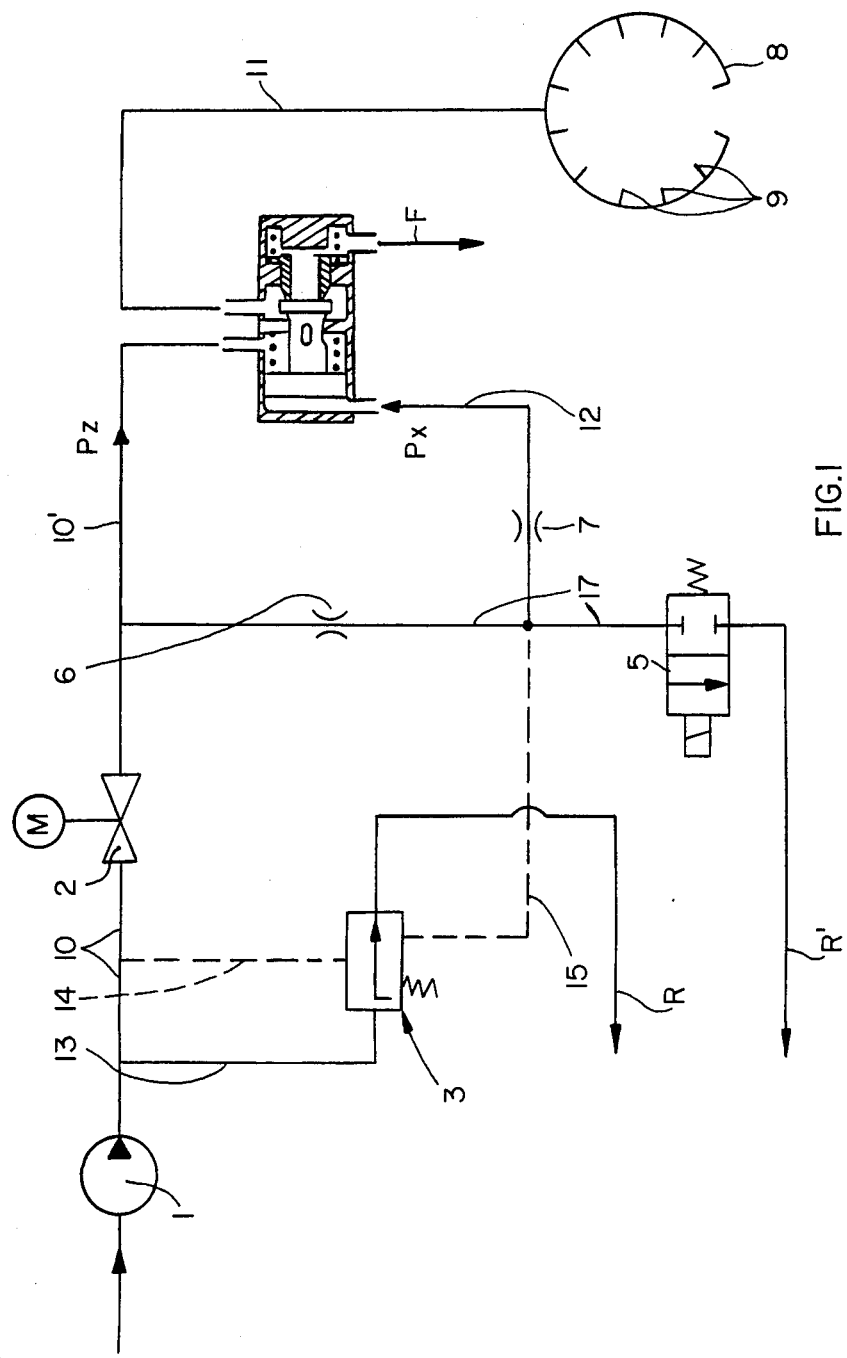
FIG. 1 is a control diagram of the invention with a schematic representation of a pressure maintaining-, drainage- and shut-off-valve.

FIG. 1 shows the control circuit cooperating with the pressure buildup, drainage, and shut-off valve described in more detail with reference to FIGS. 2 to 4, and referred to as "valve" below.

The figures show a fuel pump 1, a motor (M) for controlling a fuel metering unit 2, a differential pressure valve 3, an electromagnetically activated shut-off valve 5, a first throttle or orifice 6, a second throttle or orifice 7, a schematically depicted combustion chamber or a gas turbine engine 8 having fuel injection means or nozzles 9.

Figure 2A:
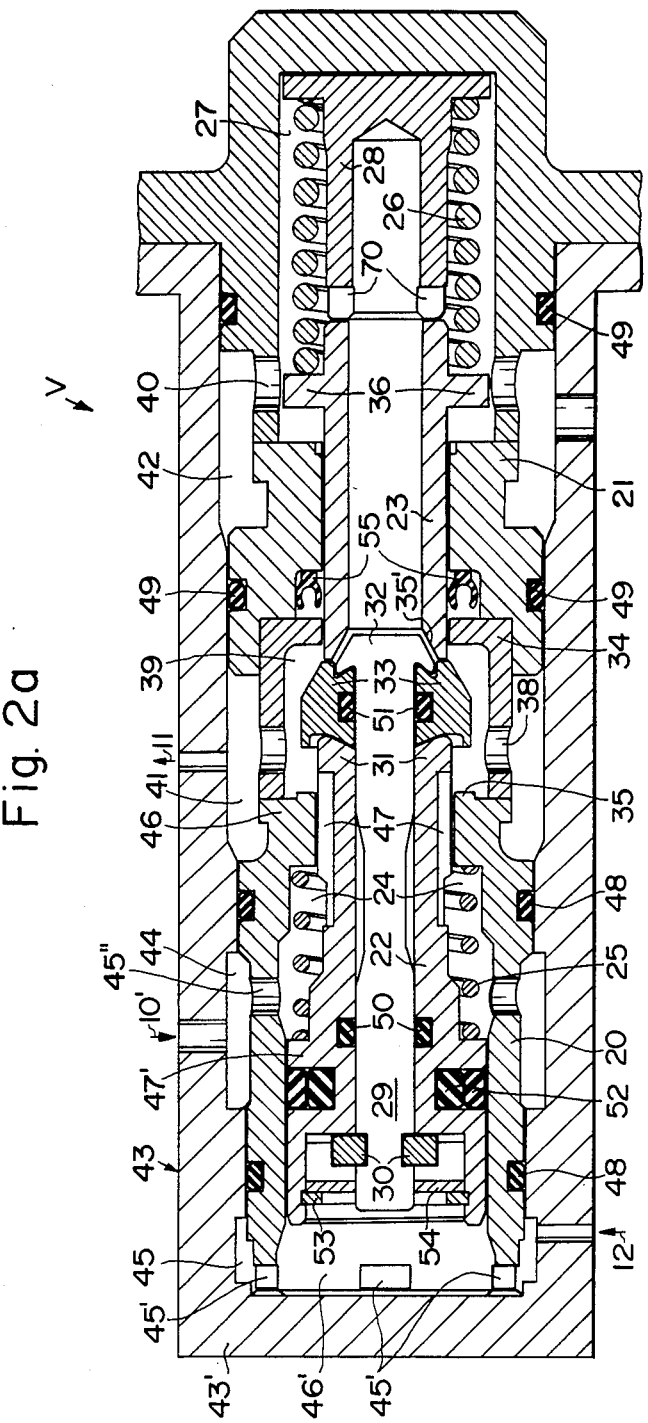
FIG. 2 is a detailed lengthwise section through a pressure build-up, drainage, and shut-off valve, wherein the lower half shows a first end position of both control pistons (fuel delivery shut-off, drainage open) and the upper half shows a second end position of both control pistons (fuel delivery open, drainage through-flow cross-sections closed)
Figure 2B:
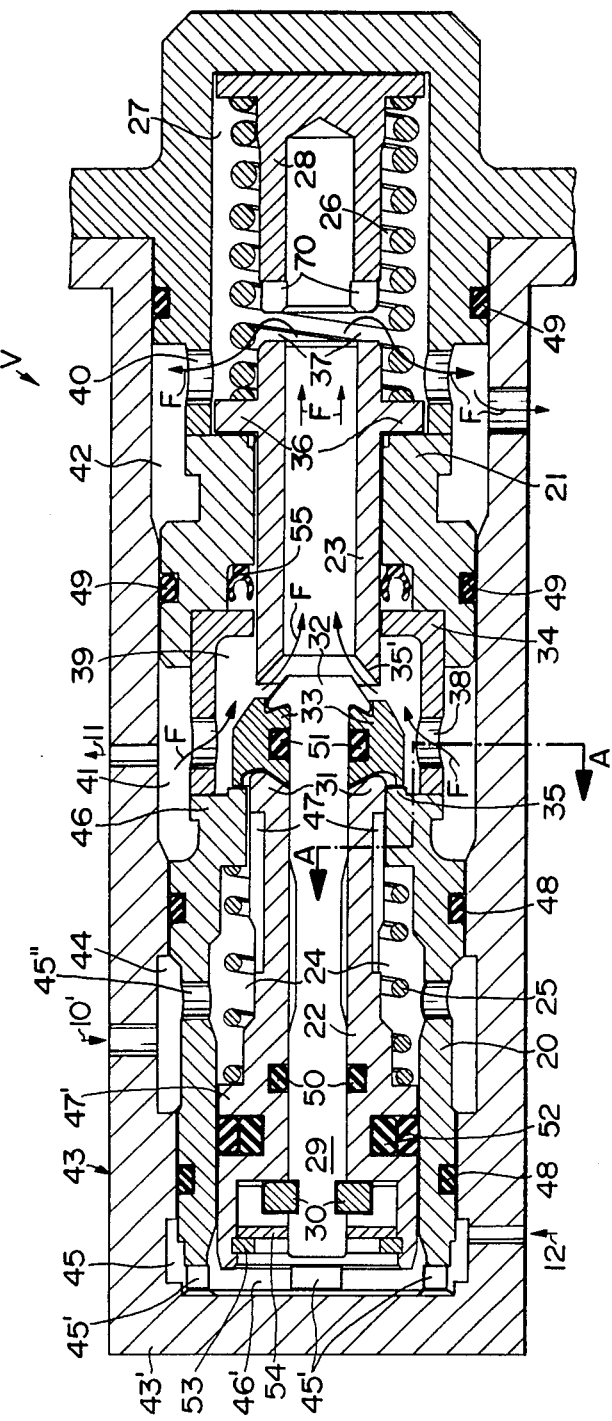

According to FIG. 1, the fuel quantity required during the operation of the engine 8 is delivered by the fuel pump 1 through a fuel supply line 10 of the fuel metering unit 2, and from there through a fuel metering line 10' to the valve V, whereby this fuel metering line 10' opens at its end into a distributor space 44 of the valve V (FIG. 2).

A fuel supply line 11 connects a distributor space 41 (FIG. 2) of the valve to the fuel nozzles 9 in the combustion chamber of the engine 8.

Due to the drainage flow F (FIG. 2) opened in the valve during shut-off, the fuel supply line 11 is a return flow line for the fuel unused at the nozzles 9, whereby the fuel may drain through the valve and a respective distributor space 42 into a drainage line.

As an essential difference from the prior art, in the valve according to the invention, the piston pressure impingement and fuel metering do not take place at the same metering surface (front piston end surface) as a function of the fuel system pressure respectively. Rather, the piston activation is achieved according to a given relation between $P_x$, $P_z$ and the pressure in the fuel supply line 11, wherein $P_z$ is the injection pressure and $P_x$ is the control pressure of the valve, which is applied separately from the lateral fuel metering 10', 44, 45", 47 of the valve at a separate location namely a housing chamber 46' in FIG. 2, to the one piston surface of the first control piston 22 (FIG. 2).

The valve control pressure $P_x$ is effective in the housing chamber 46' through the control pressure line 12, leading to the valve intake and opening at its end into the distributor space 45 (FIG. 2).

Figure 5:
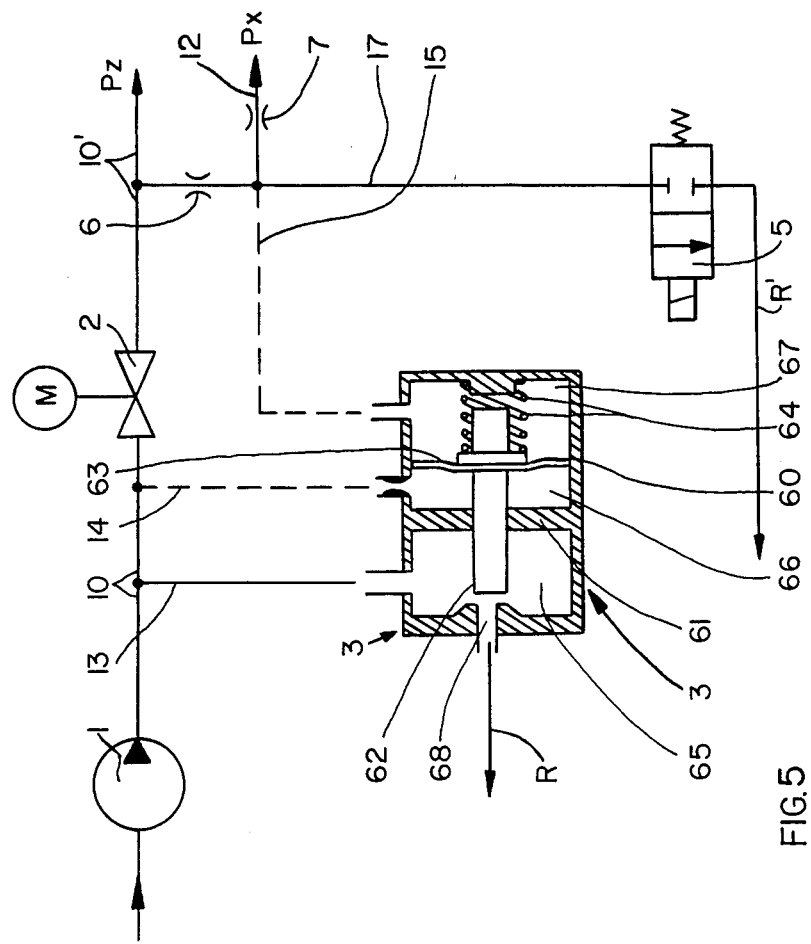
FIG. 5 is the control diagram according to FIG. 1, here however, in conjunction with the differential pressure valve shown in more detail as a lengthwise section.

The differential pressure valve 3, mentioned above, and described below in detail more with reference to FIG. 5, is integrated into the control circuit by means of the lines 14, 15, so that the valve 3 provides a constant pressure drop across the motor controlled fuel metering unit 2.

Arrow R in FIG. 1 designates the return flow of the residual fuel portion shut-off from the differential pressure valve 3. The same is true conceptually with respect to arrow R' out of the electromagnetic shut-off valve 5 which is connected to the fuel measuring line 10' by the line 17, wherein the throttle or orifice 6 is installed, between the outlet of the fuel metering unit 2 and the valve inlet of the valve 5, see FIG. 5.

In order to shut-off the engine 8 the following two possibilities exist:

(1) The motor M closes the opening cross-section of the fuel metering unit 2 and the fuel supply through the valve to the injection nozzles 9 is interrupted (normal shut-off process). As a result of the pressure drop $P_x$, $P_z$ caused simultaneously with the fuel shut-off by the valve V, the differential pressure valve 3 opens in order to allow the residual fuel R remaining therein, to drain out through the bore 68 (FIG. 5) into the tank.

(2) The electromagnetic shut-off valve 5 opens, whereby the pressure downstream of the throttle or orifice 6 is reduced. The control pressure $P_x$ at the valve V is also reduced or drops below a predetermined opening pressure whereby the valve V closes the fuel delivery to the fuel supply line 11 downstream of the injection nozzles 9; whereby the differential pressure valve 3 (Δp-valve) opens the bore 68 (FIG. 5) and guides the fuel, which is continually supplied by the pump 1, back into a tank through return flow line R. When the shut-off valve 5 is opened, excess fuel R' similarly flows immediately to the tank. Thus, a maximally rapid shut-off of the engine and the associated draining flow F (FIG. 1) is possible.

Through the installation of the orifice 7 or throttle in the control pressure line 12, a simple possibility for damping the valve is achieved.

In the following, the construction and function of the above merely basically described valve V will be described in more detail with reference FIGS. 2, 3, and 4.

The valve V comprises two cylindrical housing members joined together in an axial direction, namely a front housing member 20 and a rear housing member 21, which are provided with corresponding inner cylindrical piston guide surfaces. A first control piston 22 and a second control piston 23 are axially slideably inserted into the housing members 20, 21.

Within an annular space 24, enclosed between the front housing member 20 and the first control piston 22, a first return spring 25 in the form of a helical coil spring is arranged; a second return spring 26, also in the form of a helical coil spring, is located within a downstream annular space 27, which is formed between the cylindrically projecting end of the second control piston 23 and the axially projecting cylinder wall of a piston stop bushing 28 on one side, and the cylindrical inner wall of the rear housing member 21 on the other side.

Furthermore, the first control piston 22 sits on a central shaft 29 having a cam ring 30 set therein, by means of which the central shaft 29 forms a cam dog connection with the end face open toward the front of the first control piston 22. At the downstream end, the first control piston 22 is provided with an end part 31 having a conical concave inward taper toward the shaft 29. The shaft 29 comprises at its downstream end an end piece 32 which is rotationally symmetrically tapered in the valve axial direction with the correspondingly cone-shaped valve end surface. The other side of this end piece 32 is rotationally symmetrically concave cone-shaped. A valve disc 33 rotationally arranged on the shaft 29—between the end part 3 and the end piece 32—comprises conical counter-surfaces corresponding to the taper of end piece 32, serving as a cam dog connection when activated by the first control piston 22. In this manner the valve disc 33 is self-adjustably arranged, or due to seat alignment errors of the latter it is rotatable to compensate for such errors.

As may be further seen in FIG. 2, the second control piston 23 is axially slideably guided within the respective housing member 21 and protrudes through the radially off-set bushing end part 34 of the other or front housing member 20.

The second control piston 23 in the form of a hollow cylinder comprises, at its upstream open end, a rotationally symmetric conical shell surface 35', which is arranged at a defined spacing or distance (drainage flow F open) from the corresponding conical surface of the end piece 32 of the shaft 29 in the valve resting position or first piston end position.

The upper half of the drawing embodies the drainage flow shut-off position in which the valve disc 33 is pressed by means of the first control piston 22, against the front end edge of the second control piston 23 or rests against the latter.

In addition to the stated drainage opening or closing or sealing function, the valve disc 33 has the purpose, among others, of assuring the defined rest position of the first control piston 22 as a result of a spring enforced contact against a local projection or stop 35 of the front housing member 20.

According to the lower half of FIG. 2 the second control piston 23 rests against a radially inwardly projecting part of the rear housing member 21, by means of a radially projecting flange 36, enforced by the biasing force of the return spring 26. In this initial- or rest-position of the second control piston 23, a predetermined outflow cross-section 37 is opened between the rear end face of the second control piston 23 and the front end face of the piston stop bushing 28 for the drainage flow F into the annular space 27.

As may be further seen in FIG. 2 the bushing end part 34 of the front housing member 20 comprises several bores 38 uniformly distributed around the circumference. The bores 38 communicate with an annular chamber 39 enclosed by the bushing end part 34 across from the valve disc 33 and the up-stream end section of the second control piston 23.

Similarly, the rear housing member 21 also comprises several bores 40 uniformly distributed around the circumference. The bores 40 communicate with the annular space 27 containing the other return spring 26.

The bores 38 and 40 in turn communicate with ring-shaped distributor spaces 41, 42 which are formed, among other things, by means of sliding a common outer housing member 43 onto the housing members 20, 21.

Thus, the distributor space 41 is connected through the fuel delivery line 11 (FIG. 1) to the fuel nozzles 9 in the combustion chamber 8 while the distributor space 42 is connected to the drainage line R.

As shown according to the lower half of FIG. 2 in the first end position of both control pistons 22, 23, which is also to be described as a drainage end position, unused fuel can be directed from the fuel nozzles 9 (FIG. 1) through the fuel supply line 11 and the valve V as shown by the arrows F to the drainage line R.

The front housing member 20, and the common outer housing member 43 together enclose two further ring-shaped distributor spaces 44, 45.

The distributor space 45, which is connected to the valve control pressure $P_x$ through the line 12 (FIG. 1), communicates, by means of a housing cover 43' covering the front end of the valve V, through end recesses 45' uniformly distributed around the circumference and contained in the first housing member 20, with the end housing chamber 46'. The upstream end surfaces of the first control piston 22 project into the end housing chamber 46', and the system pressure is effective on these end surfaces.

The distributor space 44 is connected to the annular space 24 through several fuel intake bores 45'' which are uniformly spaced from one another. The first return spring 25 extends in a lengthwise direction in the annular space 24 thereby bearing between an inwardly radially projecting guide bushing 46 of the front housing member 20 and an end flange 47' of the first control piston 22. Thus, in the first piston end position shown in the flower half of FIG. 2, the first control piston 22 is pressed against the housing stop 35, due to the biasing force of the first return spring 25 through the valve disc 33.

Figure 3:
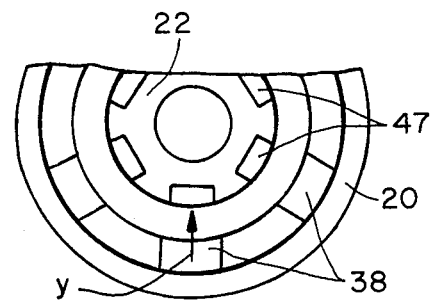
FIG. 3 shows a valve section along section line A—A of FIG. 2.
Figure 4:
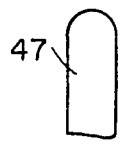
FIG. 4 is a detailed partial view of a fuel intake slot, as viewed in the direction y in FIG. 3.

As can especially be seen in FIG. 3, the first control piston 22 comprises fuel intake slots 47 formed by lengthwise recesses uniformly distributed around the circumference. These fuel intake slots 47 are in constant communication with the annular space 24. These slots 47 are closed in the first piston end position by the end part 31 of the first control piston 22 and by neighboring cylindrical guide surfaces of the guide bushing 46.

In an exact interpretation of the teaching of the invention, in a first phase only the first control piston 22 is pushed to the right by the control pressure $P_x$ against the force of the first return spring 25, so far that the valve disc 33 closes the drainage flow F, whereby the fuel intake slots 47 are not yet opened to the annular chamber 39.

Only due to a common displacement movement directed toward the right in a second phase, of the first and the second control pistons 22, 23, also against the return force of the second helical coil spring 26, the intake slots 47 are also opened to the annular chamber 39. During the movement to the right the drainage flow F is constantly closed. The intake slots 47 only provide the largest common through-flow cross-section if the rear end surface of the second control piston 23 contacts the corresponding counter surface of the piston stop bushing 28.

Thus, in the described second phase 2, the fuel metering, by means of elements 44, 45'', 24, 47, 39, 38, 41, into the fuel supply line 11 and to the fuel nozzles 9, is first achieved by means of the common piston displacement movement when the end part 31 of the first control piston 22 begins to retract out of the guide piece 46.

During shutting-off the engine and the resulting immediate pressure drop of the valve control pressure $P_x$, that is $P_x < P_z$, as a result of the common return movement of the first and second spring-loaded control pistons 22 and 23, the fuel intake slots 47 are first closed and only thereafter, however with an extremely short time delay, the drainage flow F on the fuel nozzle end is opened solely by means of the return force of the return spring 25 on the first control piston 22.

In this manner it is possible, among other things, that immediately upon shutting-off the engine, the fuel portion not used by the fuel nozzles can be drained very quickly.

The described shutting-off of the fuel intake cross-sections or slots 47 advanced in time, while shutting-off the engine and the local position of the fuel intake cross-sections or slots 47 with respect to the chamber 39, have the further essential advantage, among others, that the comparatively hot fuel residues flowing back from the nozzles 9 cannot come into any contact with the fuel intake slots 47. Hence, there is not any coking danger to be expected, especially along the slot edges which react comparatively very sensitively in this respect.

Further, as shown in FIG. 2, suitable seal rings 48 or 49 are provided between the outer housing member 43 and the front valve housing member 20 on the one hand, or the rear housing member 21 on the other hand.

Further inner seal rings 50, 51 are positively guided by the respective piston movement. One seal ring 50 is arranged on and between the first control piston 22 and the shaft 29. The other seal ring 51 is arranged on and between the valve disc 33 and the shaft 29.

A further pair of seals 52 set into a circumferential groove of the first control piston 22, seals the housing chambers 46', 24 from one another.

A securing plate 53 and a tuning disc 54 are shown in FIG. 2. The plate 53 and the disc 54 are both moved as components of the first control piston 22 (29) during its activation.

FIG. 2 also shows a sealing element 55, which, for example, is a ring- and fork-shaped sealing element arranged within an annular space between the rear housing member 21, second control piston 23, and the bushing end part 34 of the front housing member 20 projecting radially inwardly.

The function of the pressure build-up, drainage, and shut-off valve V, the structure of which has been described in detail with reference to FIGS. 2, 3, and 4 will now be described briefly.

SHUT-OFF AND DRAINAGE FUNCTION

Without pressure in pressure supply line 12, the valve disc 33 contacts the left seat or stop 35 and the valve slots 47 are not open to a through-flow. Simultaneously the valve outlet bores 40 are connected to the drainage F.

PRESSURE BUILD-UP ($P_x = P_z$)

As the control pressure $P_x$ increases in the pressure supply line 12 the first control piston 22 moves toward the right against the force of the spring 25 and the valve disc 33 contacts the right seat, that is the second control piston 23, whereby the drainage F is closed. As the pressure $P_x$ further increases in the supply line 12, both control pistons 22, 23 are moved to the right against the force of both springs 25, 26 and the valve slots 47 are opened.

The necessary pressure build-up is achieved by the through-flow volume and opening surface of the valve, corresponding to the correlation of the spring characteristic curve and effective piston surface. The maximum opening surface of the slots 47 is achieved when the second control piston 23 contacts the end surface of the piston stop bushing 28.

SHUT-OFF ($P_x < P_z$)

In order to shut-off the engine, the control pressure $P_x$ is reduced. Thereby, among other things, the first control piston 22 moves to the left, the valve closes, and the valve disc 33 contacts the left seat or stop 35. Simultaneously, the valve outlet is connected to the drainage F.

The construction and action of the differential pressure valve 3 ($\Delta p$-valve) already mentioned with reference to FIG. 1, will now be described in more detail with reference to FIG. 5.

The differential pressure valve 3 comprises a cylindrical valve housing 60 with a partition wall 61, in which a piston 62 is arranged in an axially movable guided manner. On the right side of the partition wall 61, the piston 62 is coupled to the valve housing 60 by a pressure sensitively reacting membrane 63. The membrane 63 is held in balance by means of a helical coil spring 64, which on one end is placed over the right piston end and on the other end is held in place against the right cover of the housing 60. The valve housing 60 includes three cylinder chambers 65, 66, 67 separated from one another, corresponding to the arrangement of the partition wall 61 and the membrane 63. The left housing cover of the differential pressure valve 3 comprises a central bore 68, which is constructed for returning unused fuel residues R to a tank as required. Thus, the differential pressure valve 3 is activated by the pressure difference $\Delta p$ between the supply pressure of line 14 existing in front of the membrane 63 in the cylinder space 66 and the pressure delivered by the line 15 and existing behind the membrane 63 in the cylinder space 67. The bore 68 is closed by the control piston 62, when the force of the return spring 64 together with the pressure of the line 15 exceeds the pressure in the cylinder space 66.

A pressure drop in the cylinder space 67, sensed through the line 15 with regard to the above mentioned shut-off process of the engine, brings the membrane 63 back into the balanced position according to FIG. 5, so that in the first mentioned normal shut-off case through the fuel metering unit, excessive fuel quantities can flow back to the tank out of the differential pressure valve 3 according to R. In the second shut-off case with the aid of the valve 5, fuel can be constantly delivered by the pump 1 through 13, 65, 68 and according to arrow R out of the differential pressure valve 3 back into the tank, whereby remaining system fuel flows back to the tank through the valve 5 according to R'.

Thus, the differential pressure valve V 3 makes possible a constant pressure drop across the metering unit 2.

For completeness it should be mentioned that the stop bushing 28 (FIG. 2) of the pressure build-up, drainage, and shut-off valve comprises several, here for example four, relatively small recesses 70 at its piston stop end, distributed uniformly around the circumference and each having a respective same size. Through these recesses 70 a fuel leak connection can remain to the drainage line by means of the second control piston 23 and the stop bushing 28 even during the shut-off state of the through-flow cross-sections 37, according to the upper half of the Figure.

Figure 6:
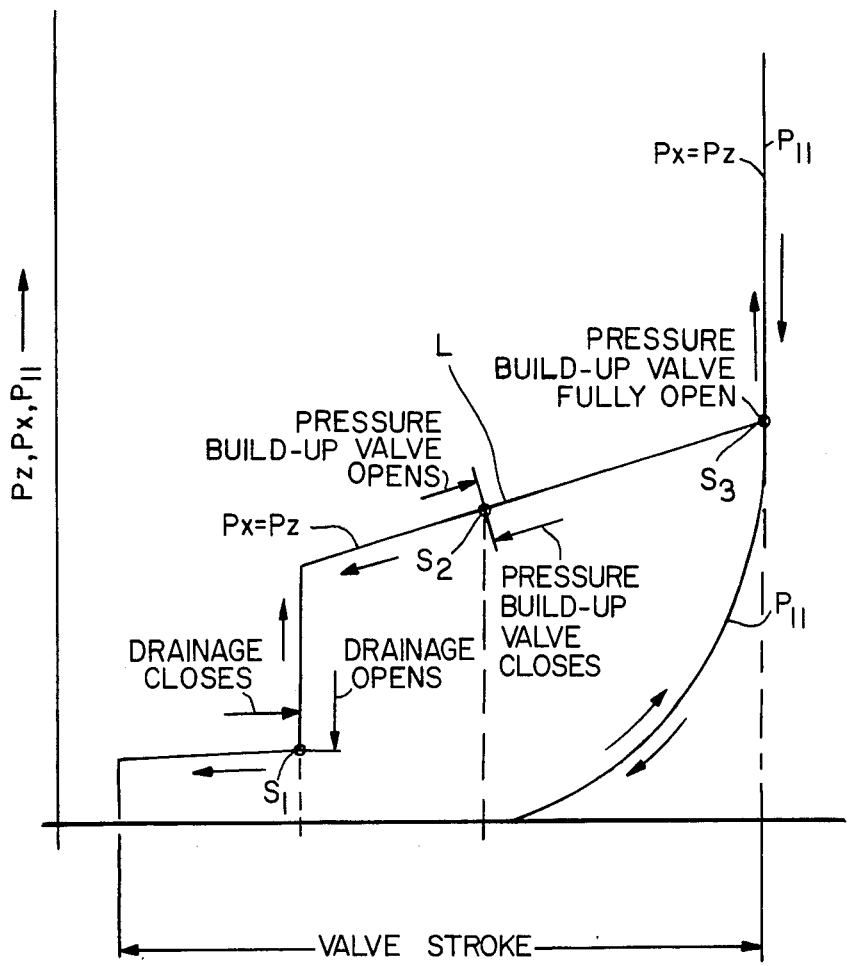
FIG. 6 is a diagram representing the qualitative pressure curve within the scope of the given relation between $P_x$, $P_z$, and $P_{11}$ as a function of the valve piston stroke.

In the diagram according to FIG. 6, the line L characterizes the progression of the pressure build-up ($P_x = P_z$) with the essential switching points $S_1$, $S_2$, $S_3$ of the pressure build-up-, drainage-, and shut-off-valve according to FIG. 2 with respect to the total piston displacement path or valve stroke.

In relation to the valve displacement (FIG. 2), respectively always seen from left to right, the first control piston 22 has thus closed the drainage closing arrangement in the annular chamber 39 at the point $S_1$. By means of the common piston displacement, the valve opening is then achieved through the fuel intake slots 47 at the point $S_2$, pressure build-up valve opens.

At the point $S_3$, the total through-flow cross-section provided by the through-flow slots 47 is fully opened. It can be seen that, starting at the switching point $S_2$, the pressure $P_{11}$ in the fuel supply line 11 rapidly increases and reaches its highest value, $P_z = P_x$, at the point $S_3$. The pressure progression arising during shutting-off the engine is represented by the reversed direction of arrows from $S_3$ through $S_2$ to $S_1$. Thereby, the "normal" shut-off or shut-down process already dealt with on page 16 under point 1 is Although the invention has been described with reference to specific example embodiments, it will be appreciated, that it is intended to cover all modifications and equivalents within the scope of the appended claims.

We claim:

1. A control valve device, especially for gas turbine engines, comprising a first control piston (22) and a second control piston (23), valve housing means for holding said first and second control pistons in an axially slidable manner, first and second compression spring means operatively arranged in said valve housing means for cooperation with said first and second control pistons, a fuel supply chamber (39) in said valve housing means, said first control piston being arranged for controlling entry of fuel into said fuel supply chamber, said second control piston having a hollow duct for guiding unused fuel to at least one discharge port (40) in said valve housing means, a fuel supply line connecting said fuel supply chamber (39) to nozzles of an engine, said first and second control pistons having end surfaces facing each other and forming a shut-off device in said fuel supply chamber (39) for shutting off unused fuel, said first control piston having a plurality of radially outwardly located fuel supply slots (47) in its outer wall, a flow control bushing (46) in said valve housing arranged for cooperation with said fuel supply slots (47) for increasingly opening a fuel inlet path into said fuel supply chamber (39) when said first and second control pistons are displaced against said first and second compression springs, a fuel inlet chamber (24) arranged in said valve housing means for cooperation with said fuel supply slots (47), whereby said fuel supply slots (47) are always in communication with said fuel inlet chamber (24), a valve closure member (33) arranged in said fuel supply chamber (39) for cooperating with said end surfaces in forming said unused fuel shut-off device and for cooperation with said flow control bushing for closing said fuel inlet path through said slots (47) into said fuel supply chamber (39), said flow control bushing (46), said fuel supply slots (47) and said shut-off device being so arranged relative to each other that fuel supply into said fuel supply chamber (39) through said slots (47) is closed-off while said shut-off device for unused fuel is fully open in a first end position of said first and second control pistons (22, 23), and so that in a first piston displacement phase said first control piston (22) is displaced against said first compression spring (25) for closing said shut-off device, a fuel outlet (37) for unused fuel being arranged for cooperation with said hollow duct in said second control piston, and further being so arranged that it is progressively closed if both control pistons move against said first and second compression springs for passing fuel through said slots (47) into said fuel supply chamber (39), and means for applying a control pressure acting separately of fuel supply pressure in said inlet chamber (24) on a control surface of said first control piston (22).

2. The control valve device of claim 1, wherein said fuel supply slots (47) extend in parallel to a longitudinal axis of said valve device, wherein said flow control bushing (46) completely closes fluid communication between said fuel supply slots (47) and said fuel supply chamber (39) when said first control piston is in a first end position, and wherein said fuel inlet chamber (24) is a ring chamber in said valve housing means, said first compression spring means being located in said fuel inlet ring chamber (24).

3. The control valve device of claim 1, further comprising a central shaft (29) inside said first control piston, means connecting said central shaft to said first control piston for movement with said first control piston, said central shaft having an end (32) projecting out of said first control piston in said fuel supply chamber (39), said valve closure member (33) being connected to said shaft end (32), said valve closure member (33) having a first surface for closing said hollow duct of said second control piston when said first control piston and said shaft are in a fuel supply position, said valve closure member having a second surface for cooperating with a surface (35) of said flow control bushing (46) for sealing said fuel supply chamber (39) from said fuel supply slots (47) when said first control piston and said shaft (29) are in a fuel flow stopping position in which said duct is open for an unused fuel return flow.

4. The control valve device of claim 3, wherein said valve closure member (33) is rotatably mounted to said shaft end (32) for a position self-adjustment of said valve closure member.

5. The control valve device of claim 1, wherein said end (32) of said central shaft (29) has a truncated conical shape for cooperating with a respective conical recess leading into said duct through said second control piston for closing said duct, and wherein said end (32) of said central shaft forms together with said first control piston a dovetail groove in which said valve closure member (33) is held.

6. The control valve device of claim 1, wherein said housing means comprise a front housing member, a rear housing member, and means for mounting said front and rear housing members to each other.

7. The control valve device of claim 1, wherein said valve housing means comprise a housing section (34) forming said fuel supply chamber (39), said housing section (34) having a radially inwardly extending end wall with a bore therein, said second control piston extending with said end surface through said bore into said fuel supply chamber.

8. The control valve device of claim 1, wherein said valve housing means comprise an end section and an intermediate guide section (21) enclosing an annular space (27), said second control piston (23) passing with a sliding fit through said intermediate guide section into said annular space (27), said second compression spring means being located in said annular space for cooperation with said second control piston in opening and closing an unused fuel drainage path (37, 40).

9. The control valve device of claim 8, further comprising a piston stop bushing (28) in said annular space (27), said piston stop bushing (28) cooperating with said second control piston in a drainage position for forming a drainage outflow cross-section (37) between the corresponding end surfaces of said second control piston (23) and said piston end stop bushing (28), said outflow cross-section (37) being connected to a drainage line through said annular space (27), said drainage outflow cross-section being closed simultaneously when a maximum fuel intake cross-section through said fuel supply slots (47) is open.

10. The control valve device of claim 9, wherein said second control piston (23) has a radially outwardly projecting flange (36), wherein said intermediate guide section (21) of said housing means comprises a stop shoulder for cooperation with said flange (36) in a first end position of said second control piston for fully opening said drainage outflow cross-section (37) when said flange (36) contacts said stop shoulder under the effect of a return force of said second compression spring means (26).

11. The control valve device of claim 1, wherein said first and second control pistons, said shut-off device, and said first and second spring means are arranged for cooperation with one another that during shut-down of the engine, first said fuel supply slots (47) are closed, and only a short time later said fuel supply chamber (39) is opened by said shut-off device (33) to said hollow duct through said second control piston (23) for forming drainage line through said second control piston (23).

12. The control valve device of claim 1, wherein said valve housing means comprise a common outer housing member (43) and a plurality of inner housing sections seated inside said outer housing member, whereby said outer housing member (43) encloses several annular distribution chambers (45, 44, 41, 42) between said outer housing member and said inner housing sections, sealing means arranged for sealing said annular distribution chambers from one another, an end chamber (46') in one of said inner housing sections, first fluid passage means (45') between said end chamber and a respective one (45) of said distribution chambers, a first spring chamber (24) for holding said first compression spring means and for passing fuel through said slots (47) into said fuel supply chamber (39), second fluid passage means (45") for passing fuel from a respective one (44) of said distribution chambers into said first spring chamber (24), third fluid passage means (38) between said fuel supply chamber (39) and the respective one (41) of said distribution chambers, a second spring chamber (27) in said housing means, and fourth fluid passage means (40) for communicating said second spring chamber (27) with the respective one (42) of said distribution chambers.

13. The control valve device of claim 12, wherein said first fluid passage means comprise several end recesses (45') distributed uniformly around the circumference of an end portion of the respective inner housing section (20) and bounded by a portion (43') of said outer housing member for providing fluid flow to an end surface of said first control piston.

14. The control valve device of claim 13, wherein said second, third, and fourth fluid passage means each comprise several throughbores (45", 38, and 40) distributed respectively uniformly about the circumference of the respective inner housing section, through which the corresponding distribution chambers (44, 41, and 42) are each singly and sequentially connected for fluid communication to the respective annular chambers (24, 39, 27).

15. The control valve device of claim 13, wherein said distribution chamber (45) is connected to a control pressure line (12), wherein said distribution chamber (44) is connected to a fuel metering line (10'), wherein said distribution chamber (41) is connected to a fuel delivery line (11) leading to at least one fuel nozzle (9), and wherein said distribution chamber (42) is connected to a drainage line (F).

16. The control valve device of claim 9, wherein said piston stop bushing (28) comprises an open end provided with several forwardly open leak flow recesses (70) distributed about the circumference of said open end of said piston stop bushing.

17. The control valve of claim 1, further comprising a fuel pump (1), fuel metering means (M, 2) and pipe lines (10) including a metered fuel line (10') connecting said fuel pump through said fuel metering means to said fuel inlet chamber (24), control pipe lines (17, 12) connecting said metered fuel line (10') to a control input of said valve housing means, said control pipe lines comprising two throttles (6, 7) arranged in series in said control pipe lines, and an electromagnetically controlled fuel supply stop valve (5) connected to a junction in said control pipe lines between said two throttles for opening said fuel supply stop valve, whereby said first control piston is moved in a direction opposite to said fuel supply direction due to a pressure drop on a control surface of said first control piston caused by the opening of said fuel supply stop valve enabling said first compression spring to restore said first control piston into a position in which said fuel supply slots (47) are closed.

18. The control valve device of claim 17, further comprising a pressure differential responsive valve (3) having a first valve chamber (66) connected to a junction in said pipe line between said fuel pump (1) and said fuel metering means (2), a second valve chamber (67) connected to said junction between said two throttles (6, 7), a flexible membrane between said first and second valve chambers, and a third valve chamber (63) connected to said pump and to a return flow conduit (R), a closure member (62) arranged in said third chamber for opening said return flow conduit (R) in response to a movement of said membrane as a result of a pressure drop at said junction between said two throttles, wherein fuel from said fuel pump is caused to flow into said return flow conduit (R) for a rapid engine shutdown.

19. The control valve device of claim 18, wherein said electromagnetically controlled fuel supply stop valve (5) and said pressure differential responsive valve (3) both respond to said pressure drop at said junction.

* * * * *